United States Patent [19]
Yamana

[11] Patent Number: 5,398,063
[45] Date of Patent: Mar. 14, 1995

[54] FOCUSING POSITION DETECTING DEVICE INCORPORATED IN A MICROSCOPE

[75] Inventor: Motokazu Yamana, Hachioji, Japan

[73] Assignee: Olympus Optical Co., Ltd., Tokyo, Japan

[21] Appl. No.: 910,109

[22] PCT Filed: Nov. 6, 1991

[86] PCT No.: PCT/JP91/01519
  § 371 Date: Jul. 2, 1992
  § 102(e) Date: Jul. 2, 1992

[87] PCT Pub. No.: WO92/09000
  PCT Pub. Date: May 29, 1992

[30] Foreign Application Priority Data
  Nov. 9, 1990 [JP] Japan .................... 2-305171

[51] Int. Cl.6 .......................................... H04N 5/232
[52] U.S. Cl. .................................. 348/345; 348/349; 348/358; 348/312; 348/316; 348/322; 348/324; 354/400
[58] Field of Search ........... 358/227, 228, 209, 213.23, 358/213.19, 213.26; 354/400, 402; H04N 5/232; 348/294, 297, 298, 311, 312, 316, 317, 319, 320, 322, 324

[56] References Cited

U.S. PATENT DOCUMENTS

| | | | |
|---|---|---|---|
| 4,411,505 | 10/1983 | Sakai et al. | 354/25 |
| 4,479,062 | 10/1984 | Kwasaki et al. | 250/578 |
| 4,563,708 | 1/1986 | Ishibashi | 358/213 |
| 4,623,927 | 11/1986 | Hoshino | 358/213 |
| 4,630,121 | 12/1986 | Suzuki et al. | 358/227 |
| 4,719,486 | 1/1988 | Hoshino et al. | 354/408 |
| 5,005,087 | 4/1991 | Suzuki et al. | 358/227 |
| 5,028,948 | 7/1991 | Yamasaki | 354/402 |

FOREIGN PATENT DOCUMENTS

| | | | |
|---|---|---|---|
| 0366413 | 5/1990 | European Pat. Off. | G02B 7/28 |
| 51-138321 | 11/1976 | Japan | H04N 5/30 |
| 60-217661 | 10/1985 | Japan | H01L 27/14 |
| 60-256279 | 12/1985 | Japan | H04N 5/335 |
| 61-35684 | 2/1986 | Japan | H04N 5/335 |
| 61-147210 | 7/1986 | Japan | G02B 7/11 |
| 61-165716 | 7/1986 | Japan | G92B 7/11 |
| 61-191177 | 8/1986 | Japan | H04N 5/335 |
| 62-19824 | 1/1987 | Japan | G02B 7/11 |

*Primary Examiner*—Michael T. Razavi
*Assistant Examiner*—Ngoc-Yen Vu
*Attorney, Agent, or Firm*—Frishauf, Holtz, Goodman & Woodward

[57] ABSTRACT

A focusing position detecting device of this invention comprises a CCD image sensor including a light receiving section in which an image of a subject which is formed by an image forming optical system and is an object of focusing position detection is projected on a plurality of picture elements, a shift register for transferring charges read out from the picture elements in synchronism with a charge transfer clock, and an output section for sequentially storing charges transferred by the shift register, a picture element readout circuit for supplying a picture element readout signal to the CCD image sensor and reading out charges stored in the picture elements to the shift register, a sampling circuit for sampling the charges stored in the output section to derive a luminance signal for each of the picture elements, a focusing position deriving circuit for deriving the focusing position of the image forming optical system from the luminance signal sampled by the sampling circuit, and a reset circuit for resetting the charges of the output section in a period which is set by multiplying a half cycle of the charge transfer clock by an integral number according to the charge storing state of the picture elements.

8 Claims, 5 Drawing Sheets

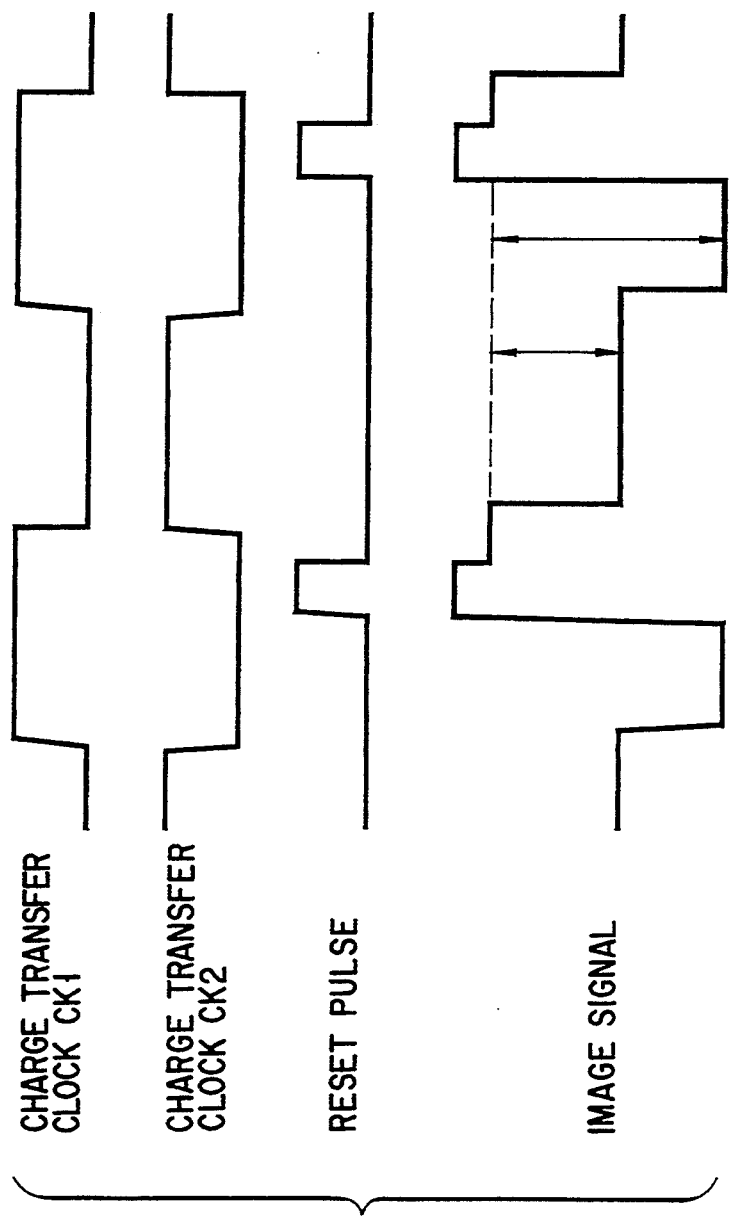
F I G. 2

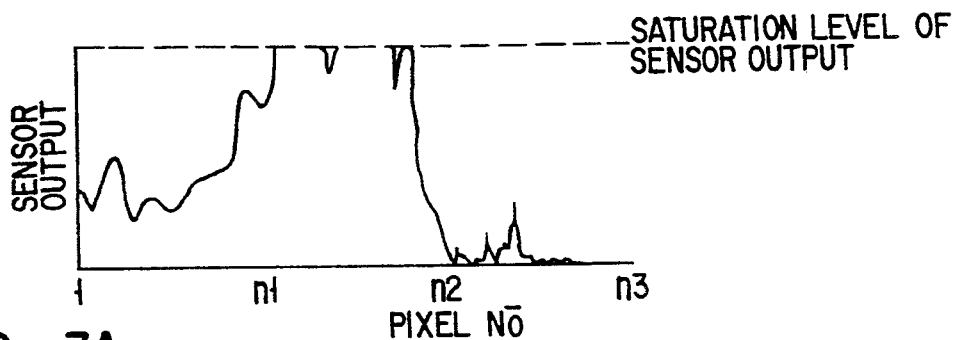
F I G. 3A
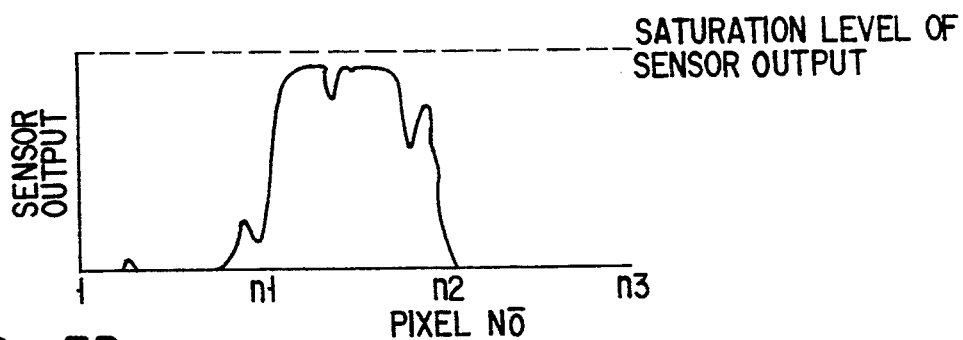
F I G. 3B
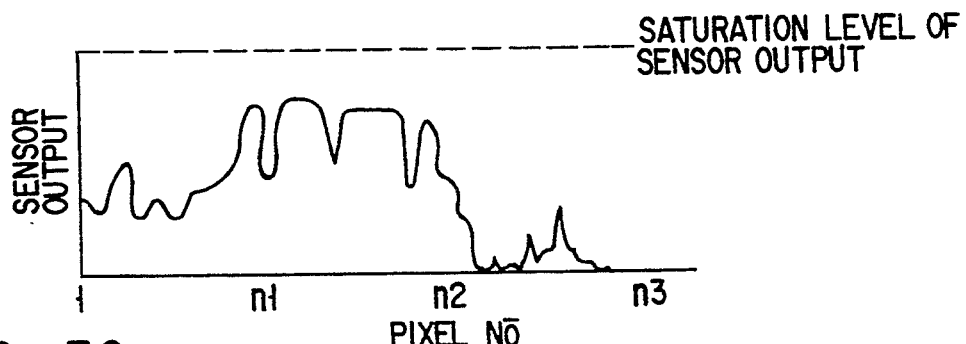
F I G. 3C
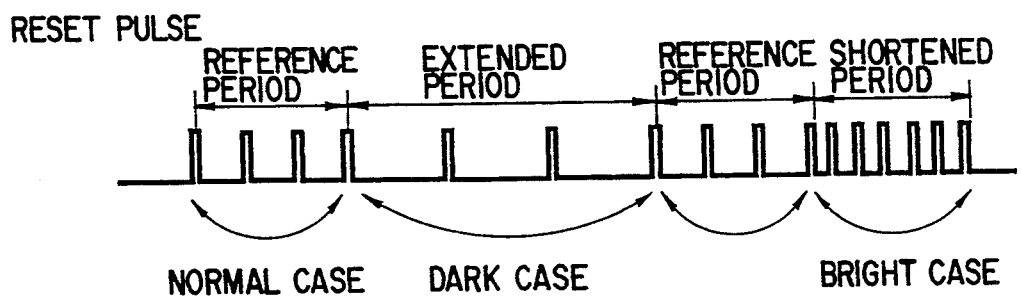
F I G. 4

FOCUSING POSITION DETECTING DEVICE INCORPORATED IN A MICROSCOPE

TECHNICAL FIELD

This invention relates to a focused position detecting device for detecting the focusing position according to luminance information of an image of a subject formed on a CCD image sensor.

BACKGROUND ART

A so-called passive type automatic focusing system creates an image of a subject on a CCD image sensor, determines the degree of blur of the image of the subject based on a luminance signal output from the CCD sensor, indicates the luminance of the image of the subject and derives the defocused amount thereof. Then, it effects the focusing in order to eliminate the defocusing amount.

As a CCD image sensor used in the above system, a sensor including a shift register disposed on one side of a large number of photoelectric elements (which are hereinafter referred to as "picture elements") arranged in a preset direction and connected to odd-numbered picture elements and a shift register disposed on the other side of the picture elements and connected to the even-numbered picture elements is known.

For example, a CCD line image sensor constructed as shown in FIG. 5 is used in the above system.

In the image sensor 1, a light receiving section 2 constructed by a plurality of picture elements is formed in a line form and two analog shift registers 3 and 4 are arranged along the light receiving section 2.

In the CCD image sensor 1, odd-numbered picture elements are connected to the shift register 3 and even-numbered picture elements are connected to the shift register 4.

Charges read out from the picture elements of the light receiving section 2 are temporarily stored in corresponding memories of the shift registers 3 and 4 and then sequentially transferred to a charge storage section 5 (since charges stored in the charge storage section are dealt as an output of the CCD image sensor, the charge storage section is hereinafter referred to as an output section) which is formed of a capacitor in response to charge transfer clocks CK1 and CK2 shown in FIG. 6.

For example, charges stored in a picture element 2n are read out into the shift register 4 and transferred from the shift register 4 to the output section 5 in response to the charge transfer clocks CK1 and CK2. A potential corresponding to the amount of charges stored in the output section 5 appears on the output side of the output section 5.

The output side of the output section 5 is connected to a sampling circuit (not shown). The sampling circuit samples the output side potential of the output section to receive the potential as a luminance signal before a reset pulse is applied to the output section 5.

In the timing chart shown in FIG. 6, a reset pulse is applied to the output section 5 so as to permit the charges of the picture element 2n to be discharged from the output section 5 before the charge transfer clocks CK1 and CK2 are changed. Then, charges of a picture element (2n-1) which are transferred by the charge transfer clocks CK1 and CK2 are stored into the thus reset output section 5.

Next, in the same manner as in a case of the picture element 2n, charges of the picture element (2n-1) stored in the output section 5 are sampled by the sampling circuit. After this, the output section 5 is reset by the reset pulse.

Thus, each time charges of one picture element are stored in the output section 5, the output section is reset and the charges read out from the picture element are sampled for each picture element.

Since a luminance signal derived from the sampling circuit contains defocusing information, the focusing position can be derived based on the luminance signal. Various methods are known as a method of deriving the focusing position by use of the luminance signal.

In a case where the amount of light of an image of a subject formed on the CCD image sensor is small, it is necessary to set the charge storage time of the light receiving section 2 longer in order to prevent degradation of the sensitivity and S/N ratio. If the charge storage time of the light receiving section 2 is set longer, the amount of charges stored in each picture element increases to improve the sensitivity and S/N ratio, thereby making it possible to attain high focusing position detecting precision.

However, with the above method, since the charge storage time of the light receiving section 2 is set longer, a problem that the focusing position detecting time will become longer occurs.

DISCLOSURE OF INVENTION

An object of this invention is to provide a focusing position detecting device capable of improving the S/N ratio and sensitivity with respect to an image of a subject of low luminance and effecting the high-speed and precise focusing position detection.

In order to attain the above object, a focusing position detecting device of this invention comprises a CCD image sensor including a light receiving section having a plurality of picture elements for generating charges corresponding to the amount of light, an image of a subject which is formed by an image forming optical system and is an object of focusing position detection being projected on the plurality of picture elements, a shift register for transferring charges read out from the picture elements in a preset direction in synchronism with a charge transfer clock, and an output section formed of a capacitor for sequentially storing charges transferred by the shift register; a picture element readout circuit for supplying a picture element readout signal to the CCD image sensor for a predetermined charge storing time and reading out charges stored in the picture elements in the predetermined charge storing time to the shift register for each picture element; a sampling circuit for sampling the charges stored in the output section to derive a luminance signal for each of the picture elements; a focusing position deriving circuit for deriving the focusing position of the image forming optical system from the luminance signal sampled by the sampling circuit; and a reset circuit for resetting the charges of the output section in a period which is set by multiplying a half cycle of the charge transfer clock by an integral number according to the charge storing state of the picture elements.

A focusing position detecting device of this invention further comprises an image memory for storing the luminance signal output from the sampling circuit for each of the picture elements of the CCD image sensor; an optimum storing time detecting section for determining the charge storing time which causes the stored charges of each of the picture elements to be prevented from being saturated or being insufficient according to luminance data of each picture element indicated by the luminance signal stored in the image memory; and a storage time specifying section for controlling the image readout circuit to output the picture element readout signal to the CCD image sensor for the optimum storage time determined by the optimum storage time detecting section.

According to this invention, the output section of the CCD image sensor is reset in a desired reset period set by multiplying the half cycle of the clock by an integral number according to the charge storing state of the picture elements. For example, when the picture element is saturated, the reset period is shortened, and in the case of insufficient charge storage, the reset period is extended.

At this time, since the reset period is always set to be an integer multiple of the half cycle of the charge transfer clock, the resetting operation can be effected for each picture element. Since the stored charges of the output section are reset after the stored charges are sampled, charges of a preset number of picture elements are sampled by the sampling circuit. A preset operation is effected in the focusing position deriving circuit according to the sampled luminance signal to detect the focusing position.

Thus, the dynamic range of the luminance signal used in the focusing position detecting operation is increased without extending the charge storing time in each of the picture elements of the CCD image sensor, thereby improving the sensitivity and SN ratio. As a result, the operation speed of the focusing position detecting operation can be enhanced and the precision of detection can be enhanced.

Further, according to this invention, a luminance signal is stored into the image memory for each picture element. Then, the charge storing time which causes the stored charges of each of the picture elements of the CCD image sensor to be prevented from being saturated or being insufficient is determined according to luminance data stored in the image memory. The image readout signal is output to the CCD sensor for the charge storing time.

BRIEF DESCRIPTION OF DRAWINGS

FIG. 2 is a timing chart for illustrating the operation of the focusing position detecting device of the above embodiment;

FIG. 3A-3C are diagrams showing a luminance signal output from a CCD image sensor;

FIG. 4 is a diagram showing a pattern of a picture element resetting period;

BEST MODE OF CARRYING OUT THE INVENTION

There will now be described an embodiment of this invention.

Figure 1:
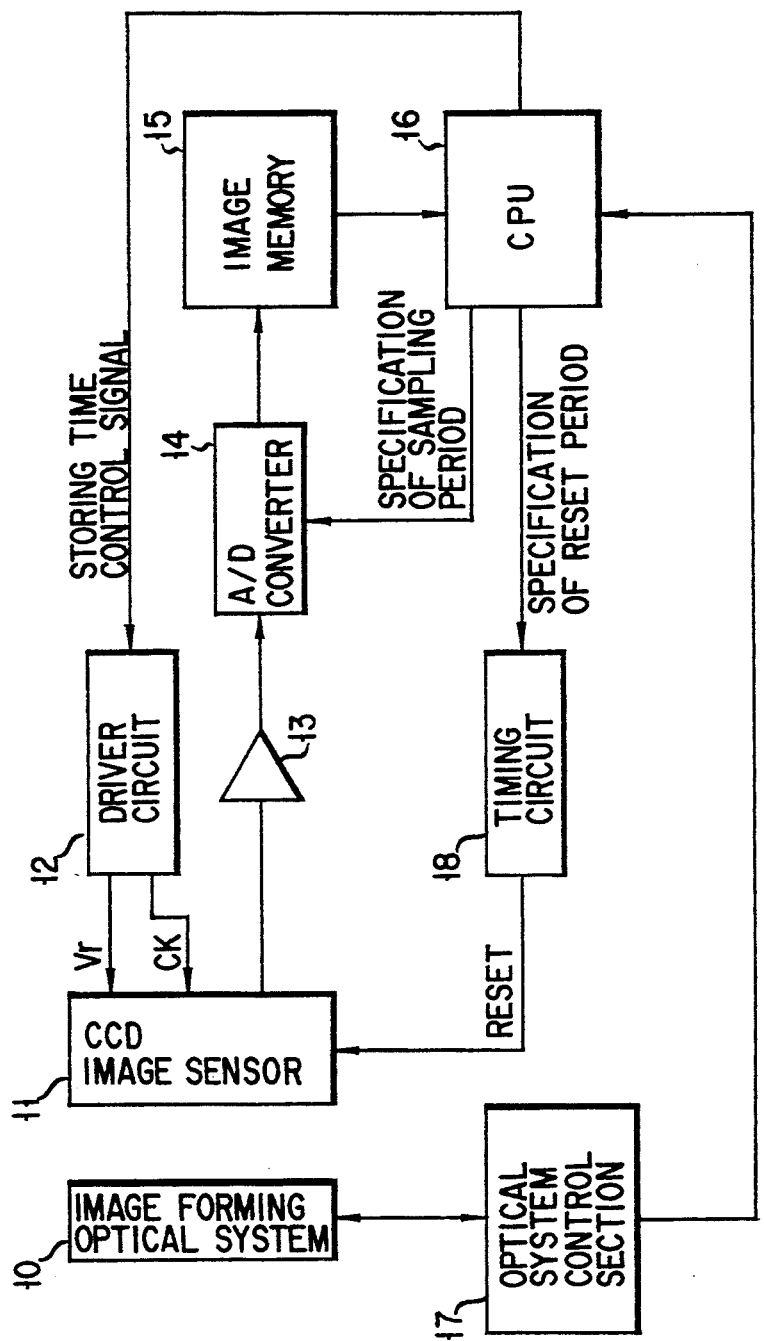
FIG. 1 is a functional block diagram of a focusing position detecting device according to one embodiment of this invention.

In FIG. 1, the whole construction of a focusing position detecting device according to one embodiment of this invention is shown. In this embodiment, an image of a subject is formed on a light receiving section of a CCD image sensor 11 by means of an image forming optical system 10.

Figure 5:
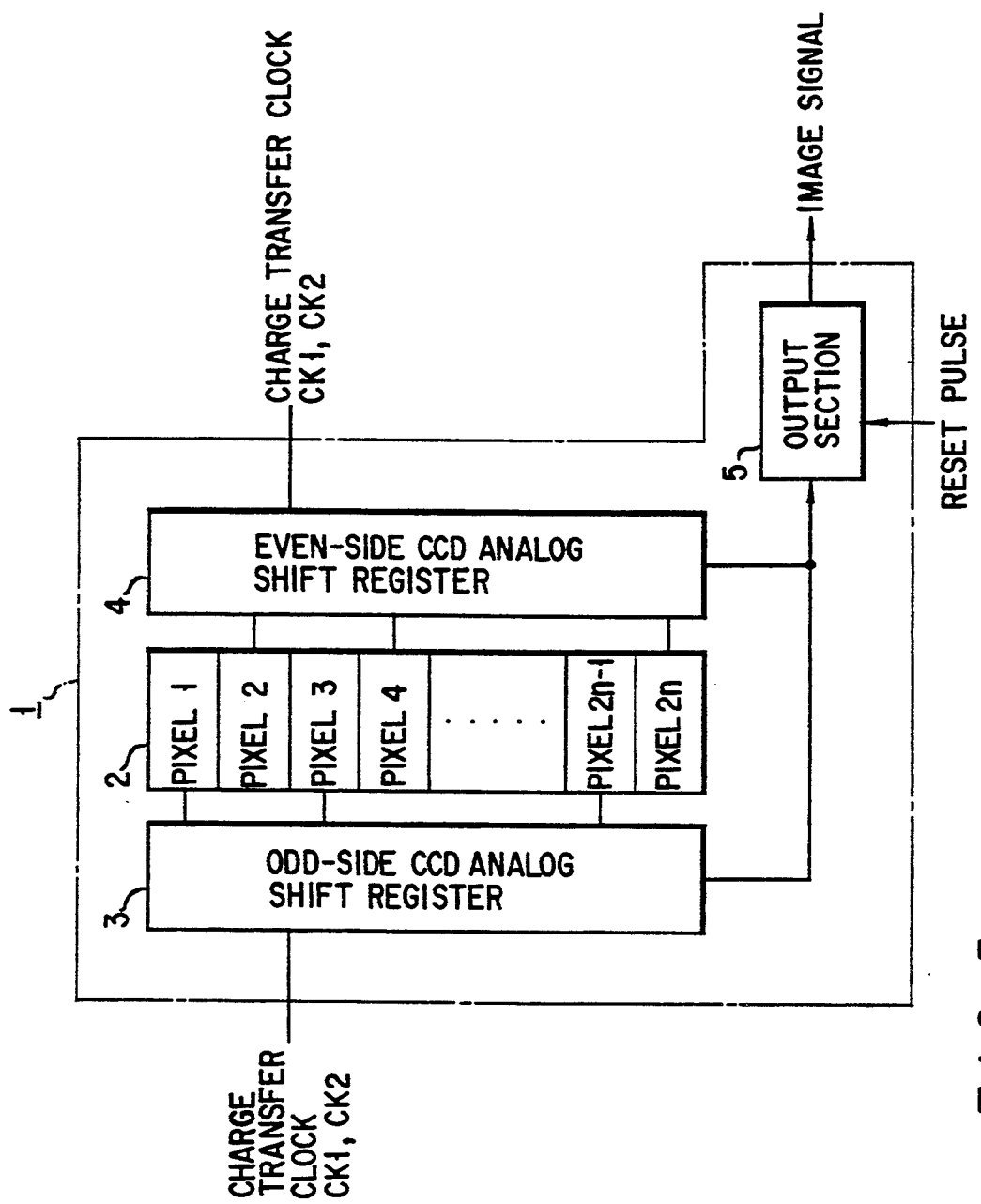
FIG. 5 is a construction diagram of a CCD line image sensor.
Figure 6:
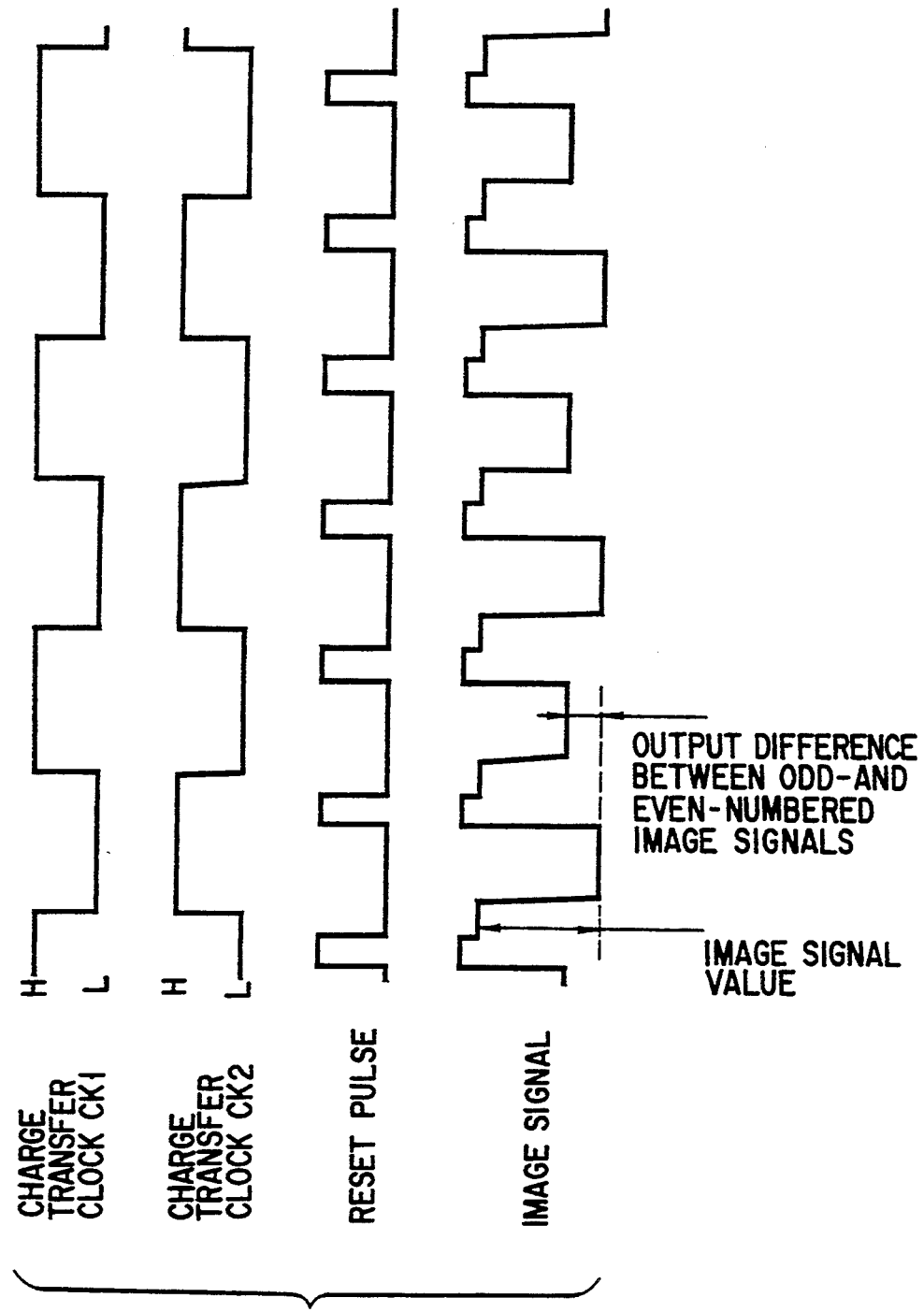
FIG. 6 is a diagram for illustrating the operation of the CCD line image sensor shown in FIG. 5.

Assume that the CCD image sensor 11 has the same construction as that of the image sensor shown in FIG. 5. Therefore, constituents of the image sensor 11 are explained by using the same reference numerals as those shown in FIG. 5.

Each of the CCD image sensor 11 is supplied with a picture element readout signal Vr from a driver circuit 12. Charges read out from the picture elements are input to shift registers 3 and 4 connected thereto.

The shift registers 3 and 4 are respectively supplied with charge transfer clocks CK1 and CK2 shown in FIG. 2 from the driver circuit 12.

An output section 5 of the CCD image sensor 11 is connected to a preamplifier 13. An output side of the preamplifier 13 is connected to an A/D converter 14.

The A/D converter 14 samples an output signal (luminance signal) of the CCD image sensor 11 supplied via the preamplifier 13 in a preset period. Luminance data sampled by the A/D converter 14 is stored into an image memory 15.

Luminance data stored in the image memory 15 contains information (the degree of blur) relating to the focusing state of the image of the subject and is read out by a CPU 16.

Information relating to the image forming optical system for projecting the image of the subject on the CCD image sensor 11 is input from an optical system controlling section 17 to the CPU 16.

Further, the output section 5 of the CCD image sensor 11 is reset by a reset pulse output from a timing circuit 18.

The CPU 16 has the focusing position detecting function, sampling picture element pitch setting function and storage time controlling function.

The focusing position detecting function is a function for deriving the focusing position according to position information, projection magnification information, numerical aperture and other information of the image forming optical system 10 for projecting the image of the subject on the CCD image sensor 11 and sampled luminance data indicating the focusing state of the image of the subject.

The sampling picture element pitch setting function is a function for sampling the stored charge amount of the output section 5 as a composite luminance signal of a plurality of picture elements after combining charges of a plurality of successive picture elements in the output section 5.

In order to realize the above function, the CPU 16 controls the driver circuit 12 and timing circuit 18 at timings shown in FIG. 2. That is, the period of the reset pulse output from the timing circuit 18 is set to an integer multiple (in FIG. 2, a case where the period is doubled is shown) of a half cycle of the charge transfer clock CK according to information relating to the image forming optical system 10.

Further, the sampling period of the A/D converter 14 is determined according to the reset period so as to effect the sampling operation immediately before the output section 5 is reset.

The storage time controlling function is to determine the luminance value of the image of the subject on the picture elements of the CCD image sensor 11 according to luminance data received from the image memory 15. Then, the storing time optimum for the entire portion of the subject is determined according to the thus derived luminance values of the respective picture elements.

Setting of the charge storing time is effected by controlling the output timing of the picture element readout signal vr output from the driver circuit 12.

The CPU 16 uses the storing time control signal to effect the reset period changing function with respect to a desired group of picture elements shown in FIG. 4. That is, with the thus determined optimum storing time, the driver circuit 12 is controlled to extend the reset pulse period with respect to a picture element group in which picture element collapse may occur and shorten the reset pulse period with respect to a picture element group in which saturation will occur.

Next, the operation of the embodiment with the above construction is explained.

First, the operation of charge readout from the picture elements based on the storing time controlling function is explained.

In a case where the luminance range of the subject is wide, picture elements n1 to n2 in which saturation occurs may be contained in the image sensor output as shown in FIG. 3A.

With the prior art method, in the above-described case, the charge storing time for all of the picture elements is uniformly shortened. However, if such a storing time controlling operation is effected, picture element collapse will occur in picture elements 1 to n1 and n2 to n3 whose charge storing amount is small as shown in FIG. 3B.

Therefore, in this embodiment, the reset period in one scanning operation is made variable and the reset period only for the picture elements n1 to n2 in which saturation occurs is shortened. That is, the reset pulse is variably set for each picture element group so as to derive optimum output levels for all of the respective picture elements in one scanning operation. As a result, a luminance signal output as shown in FIG. 3C can be obtained.

The picture elements of the CCD image sensor 11 are supplied with the picture element readout signal Vr at timings set in the above-described manner. Charges of the respective picture elements read out at the above-described timings are received by the shift registers 3 and 4 connected thereto. The picture element charges received by the shift registers 3 and 4 are alternately transferred to the output section 5 for each picture element in response to the charge transfer clocks CK1 and CK2 shown in FIG. 2, for example. The output section 5 is reset in a reset period which is equal to twice the half cycle of the charge transfer clock CK.

That is, after charges of one picture element are transferred from each of the right and left shift registers 3, 4 and then the reset operation is effected. As a result, charges of two adjacent odd-numbered and even-numbered picture elements are stored into the output section 5. A potential corresponding to the charges of two adjacent odd-numbered and even-numbered picture elements is sampled by the A/D converter 14. Since the A/D converter 14 samples the potential set immediately before the reset operation is effected, a luminance signal corresponding to combined charges of the two picture elements is sampled.

The same operation is repeatedly effected for all of the picture elements of the CCD image sensor 11 to sample luminance signals.

The CPU 16 determines the degree of blur based on luminance data received in the above-described manner and derives the focusing position based on the result of determination and information input from the optical system control section 17.

Thus, according to this embodiment, since the reset period is shortened for the picture element group in which saturation occurs and the reset period is extended for the picture element group in which insufficient storage causing picture element collapse occurs according to the charge storing state for each picture element, the charge storing time can be set shorter in comparison with a conventional case wherein the charge storing time is set so as to cause a sufficient amount of charges to be stored for all of the picture elements.

Further, since the reset period of the output section 5 is set to an integer multiple of the half cycle of the charge transfer clocks CK1 and CK2, picture elements transferred from the different shift registers 3 and 4 are combined in the output section 5 and the combined charges are sampled as a luminance signal. Thus, an output difference between the odd-numbered and even-numbered picture elements can be reduced.

Further, since a plurality of picture elements are combined, the dynamic range can be increased, thereby making it possible to improve the sensitivity and SN ratio and enhance the focusing position detecting precision.

Further, since the number of picture elements combined in the output section 5 can be freely set according to an instruction from the CPU 16, the optimum picture element pitch suitable for the focusing position detecting operation can be set according to the luminance of the image of a subject.

For example, when this embodiment is applied to an automatic focusing device of a microscope or when observation for a dark subject or fluorescent observation is effected, rough automatic focusing can be effected while the picture element pitch is set larger and a sufficiently high sensitivity is attained, and then the picture element pitch is set to an optimum pitch and the focusing operation of high precision can be effected.

Further, in this embodiment, since the reset period of a corresponding picture element is selectively changed according to the luminance as shown in FIG. 4, an adequate output level can be obtained in the entire period of one scanning operation without causing a problem of picture element collapse or saturation, and a preferable image signal can be obtained so that the focusing position detecting operation of high precision can be effected.

Therefore, according to this invention, a focusing position detecting operation of high speed and high precision can be effected for the image of a subject of low luminance without extremely extending the storing time in the CCD output section.

I claim:

1. A focusing position detecting device incorporated in a microscope, comprising:

a CCD image sensor including photoelectric means having a plurality of picture elements for generating charges corresponding to the amount of light, an image of a subject which is formed by an image forming optical system and is an object of focusing position detection being projected on said plurality of picture elements, charge transfer means for transferring charges read out from said picture elements in a preset direction in synchronism with a charge transfer clock, and charge storing means for sequentially storing charges transferred by said charge transfer means;

picture elements readout means for reading out the charges from said picture elements and supplying said read-out charges to said charge transfer means for each picture element, in response to a picture element read out signal supplied to said CCD image sensor when a charge generating time period during which the charges are generated is passed;

reset means for resetting the charges of said charge storing means in a reset period which is determined by multiplying a half cycle of the charge transfer clock by an integral number;

sampling means for sampling the charges stored in said charge storing means to derive a luminance signal for each of said picture elements, at a time just before the charges of said charge storing means are reset by said reset means;

focusing position deriving means for deriving the focusing position of said image forming optical system from the luminance signal sampled by said sampling means;

reset period changing means for changing the number of picture elements of charges stored in said charge storing means by changing the reset period by said reset means;

sampling period changing means for changing the sampling period by said sampling means according to the reset period changed by said reset period changing means;

reset period change instruction means for instructing said reset period changing means in an optimum reset period for detecting the focusing point;

wherein the optimum reset period is determined on the basis of the optical conditions of the image forming optical system or on the basis of image information on the subject.

2. A focusing position detecting device according to claim 1, further comprising:

image memory means for storing the luminance signal output from said sampling means for each of said picture elements of said CCD image sensor;

optimum charge generating period detecting means for determining an optimum charge generating period which causes the generated charges of each of the picture elements to be prevented from being saturated or being insufficient according to luminance data of each of said picture elements indicated by the luminance signal stored in said image memory means; and charge generating period specifying means for controlling said picture element readout means so that the picture element readout signal is supplied to said CCD image sensor when the optimum charge generating period determined by said optimum charge generating period detecting means is passed.

3. A focusing position detecting device according to claim 1, wherein said reset period changing means includes means for shortening the reset period for the picture elements in which generated charges are saturated and extending the reset period for the picture elements in which generated charges are insufficient.

4. A focusing position detecting device according to claim 1, wherein said reset period change instruction means determines a reset period optimized according at least to information based on a relative distance between said image forming optical system and the subject.

5. A focusing position detecting device according to claim 1, wherein said reset period change instruction means determines the reset period optimized according at least to projection magnification information of said image forming optical system.

6. A focusing position detecting device according to claim 1, which further comprises image memory means for storing the luminance signal output from said sampling means for each of said picture elements of said CCD image sensor, and said reset period change instruction means determines the reset period optimized according to the luminance data of each of said picture elements indicated by the luminance signal stored in said image memory means.

7. A focusing position detecting device according to claim 1, wherein said reset period change instruction means determines the reset period optimized according at least to a kind of a contrast method employed by the microscope.

8. A focusing position detecting device according to claim 1, wherein said reset period change instruction means determines the reset period optimized according at least to a result of a calculation by said focusing position deriving means.

* * * * *